US008683267B2

(12) United States Patent
Chandran et al.

(10) Patent No.: US 8,683,267 B2
(45) Date of Patent: Mar. 25, 2014

(54) VIRTUAL DEBUGGING SESSIONS

(75) Inventors: Shajith Chandran, Bangalore (IN); Manish Kulshreshtha, Chennai (IN); Anil K. Singh, Bangalore (IN); Dilip K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 13/155,241

(22) Filed: Jun. 7, 2011

(65) Prior Publication Data

US 2012/0317443 A1 Dec. 13, 2012

(51) Int. Cl.
G06F 11/00 (2006.01)

(52) U.S. Cl.
USPC .......................... 714/38.1; 717/124

(58) Field of Classification Search
None
See application file for complete search history.

(56) References Cited

U.S. PATENT DOCUMENTS

| | | | |
|---|---|---|---|
| 5,319,645 A * | 6/1994 | Bassi et al. | 714/38.13 |
| 6,175,914 B1 | 1/2001 | Mann | |
| 6,219,782 B1 | 4/2001 | Khan et al. | |
| 6,769,077 B2 | 7/2004 | Vachon et al. | |
| 6,839,894 B1 | 1/2005 | Joshi et al. | |
| 7,428,727 B2 | 9/2008 | Alverson et al. | |
| 7,634,761 B2 | 12/2009 | Buschardt et al. | |
| 2005/0223359 A1 | 10/2005 | Rao Nagaraju et al. | |
| 2008/0155505 A1 | 6/2008 | Lin et al. | |
| 2008/0301417 A1 * | 12/2008 | Law et al. | 712/227 |
| 2012/0102466 A1 * | 4/2012 | Bates | 717/125 |
| 2012/0278790 A1 * | 11/2012 | Bates | 717/125 |

FOREIGN PATENT DOCUMENTS

EP 730227 B1 6/2002

OTHER PUBLICATIONS

Kang Su Gatlin, Trials and Tribulations of Debugging Concurrency, Magazine Queue, vol. 2 Issue 7, Oct. 2004.
Emmanuel et al., Approach for Debugging in a Single Session GDB, IET-UK International Conference on Information and Communication Technology in Electrical Sciences, Dec. 20-22, 2007, pp. 1043-1046.
Brummayer et al., Automated Testing and Debugging of SAT and QBF Solvers, Theory and Applications of Satisfiability Testing—SAT 2010 13th International Conference, Jul. 11-14, 2010, pp. 44-57.
Fabio Abreu Dias De Oliveira, Towards Mistake-Aware Systems, Oct. 2010.
Wisehart, "Debugging Embedded Systems," Dr. Dobb's The World of Software Development, Jun. 1, 1999, http://drdobbs.com/184403666.

* cited by examiner

*Primary Examiner* — Scott Baderman
*Assistant Examiner* — Jason Bryan
(74) *Attorney, Agent, or Firm* — Kunzler Law Group (57) ABSTRACT

An approach to providing multiple concurrently executing debugging sessions for a currently executing operating system. The approach involves providing one first debugging session for debugging the currently executing operating system. The first debugging session has read access and write access to the data of the currently executing operating system. The approach also involves providing one or more second debugging sessions for the currently executing operating system. Each of the second debugging sessions has read-only access to the data of the currently executing operating system. The second debugging sessions run simultaneously with the first debugging session if the second debugging sessions are started while the first debugging session is active. As a result, multiple users can simultaneously debug the currently executing operating system. A lock may be used to ensure that only the first debugging session has write access to the data. The lock may be shared between the various debugging sessions for the operating system.

20 Claims, 8 Drawing Sheets

VIRTUAL DEBUGGING SESSIONS

BACKGROUND

1. Field

The subject matter disclosed herein relates to debugging a currently executing operating system.

2. Description of the Related Art

A computer system crash occurs when an application, of part of an operating system, exits abnormally. The operating system may crash, for example, if a hardware exception occurs that cannot be handled, or when internal sanity checking logic detects that the operating system has lost internal self-consistency. A computer system may also hang; that is, the computer system may cease to respond to inputs. Debuggers are tools that can be used to diagnose and examine the causes of a crash or a hang.

If a computer system crashes, or is hung, only one user can open a debugging session using the debugger associated with the computer system and debug the currently executing operating system. If multiple users wish to debug the computer system, a user may need to trigger a system dump (also referred to as a kernel dump) which can then be analyzed by multiple simultaneously users. However, it is often desirable to allow multiple users to open multiple debugging sessions on the currently executing computer system that has crashed or that is hung.

BRIEF SUMMARY

From the foregoing discussion, it should be apparent that a need exists for an apparatus, method, and computer program product that allows for multiple sessions for debugging a currently executing operating system.

In one embodiment, an approach to debugging a currently executing operating system may involve an apparatus with a main module and a secondary module. The main module may be configured to provide one first debugging session for debugging a currently executing operating system, the first debugging session having read access to currently executing operating system data and write access to the currently executing operating system data. The secondary module may be configured to provide one or more second debugging sessions of the currently executing operating system, each of the second debugging sessions having read-only access to the currently executing operating system data, and the second debugging sessions running simultaneously with the first debugging session in response to the second debugging sessions starting while the first debugging session is active.

An approach to debugging a currently executing operating system may also be realized in a system. The system may include a processor and memory, an operating system kernel, and a debugging session apparatus. The debugging session apparatus may include a main module and a secondary module as described above. The main module may be configured to provide one first debugging session for debugging a currently executing operating system, the first debugging session having read access to currently executing operating system data and write access to the currently executing operating system data. The secondary module may be configured to provide one or more second debugging sessions of the currently executing operating system, each of the second debugging sessions having read-only access to the currently executing operating system data. The second debugging sessions may run simultaneously with the first debugging session in response to the second debugging sessions starting while the first debugging session is active.

An approach to debugging a currently executing operating system may also be realized in a method. The method may involve providing one first debugging session for debugging a currently executing operating system, the first debugging session having read access to currently executing operating system data and write access to the currently executing operating system data. The method may also involve providing one or more second debugging sessions of the currently executing operating system, each of the second debugging sessions having read-only access to the currently executing operating system data, and the second debugging sessions running simultaneously with the first debugging session in response to the second debugging sessions starting while the first debugging session is active.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the C programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
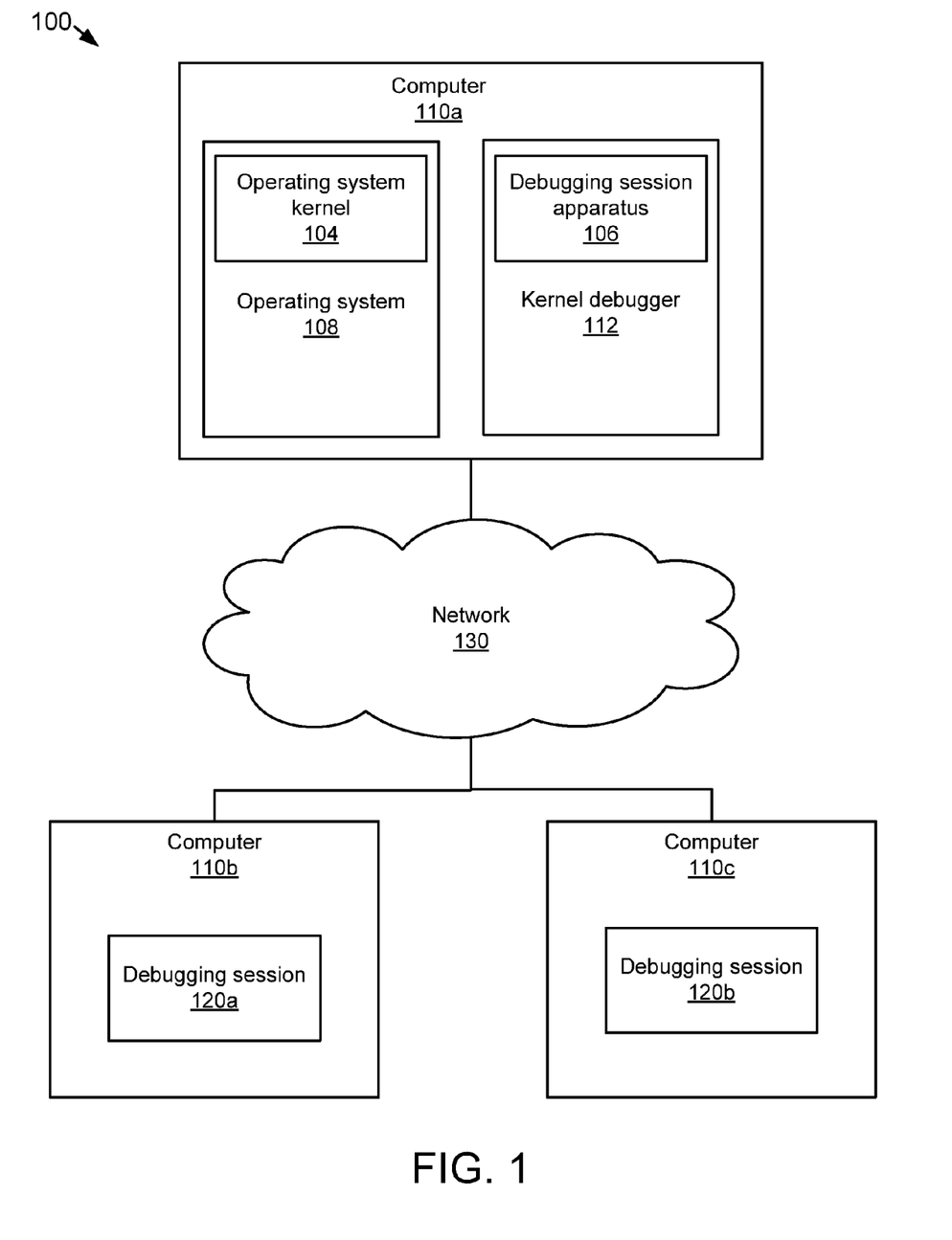
FIG. 1 is a schematic block diagram illustrating one embodiment of a system for providing multiple, concurrent debugging sessions for debugging an operating system.

FIG. 1 depicts one embodiment of system 100 including a computer 110a communicatively connected to computers 110b and 110c. The computer 110a is depicted as including an operating system kernel 104 and a debugging session apparatus 106. The computers 110b and 110c are depicted as including debugging sessions 120a and 120b. FIG. 1 is only a partial representation of the components that may exist in the system 100 in order to facilitate easier understanding.

The computer 110a is depicted as including an operating system 108. The operating system 108 manages hardware resources of the computer 110a and provides common services for the execution of various applications. The operating system 108 may comprise a variety of components, including the operating system kernel 104.

An operating system kernel 104 is a component of the operating system 108 that acts as a bridge between applications and the hardware of the computer 110a. The operating system kernel 104 may be, for example, a monolithic kernel, microkernel, or other variety of kernel provided by any of a variety of kernel designers. The primary purpose of the operating system kernel 104 is typically to manage the resources of the computer 110a and to allow applications and programs to access and use these resources.

For a variety of reasons, an operating system 108 may cease to function normally. The operating system 108 may crash if a hardware exception occurs that cannot be handled, or when internal sanity checking logic detects that the operating system has lost internal self-consistency. The operating system 108 may hang and cease to respond to inputs.

The kernel debugger 112 is a tool that allows users to diagnose and address an operating system 108 that has ceased to function normally. The kernel debugger112 may be implemented as part of the operating system kernel 104 and/or the operating system 108, or may be implemented separately. The kernel debugger 112 may be a stub that implements low level operations, and that sends and received commands to a separate machine such as the computers 110b and 110c. The kernel debugger 112 may also provide a command line or other interface that can be used directly on the computer 110a that is being debugged. One or more functions and components of the kernel debugger 112 may be distributed in the system 100.

The debugging session apparatus 106 provides support for a plurality of simultaneous debugging sessions 120 for the currently executing operating system 108. The debugging session apparatus 106 may be implemented as part of the kernel debugger 112, or may be implemented separately. The debugging session apparatus 106 may be distributed throughout the system 100.

The computer 110a executing the debugging session apparatus 106 may be connected to one or more distinct computers 110b and 110c. FIG. 1 shows the computer 110a connected to computers 110b and 110c via a network 130. The network 130 may be a local area network (LAN), wide area network (WAN), or other variety of network 130. In certain embodiments, the computer 110a connects to the computers 110b and 110c via serial line, an Institute of Electrical and Electronics Engineers (IEEE) 1394 (commonly referred to as firewire) connection, a universal serial bus (USB) connection, Ethernet, or other variety of communications connection. In one embodiment, the computer 110*a* may be a mainframe computer and the computers 110*b-c* may be terminals connected to the mainframe computer.

The system 100 may include computers 110*b* and 110*c* that can be used to run debugging sessions 120*a* and 120*b* respectively. The debugging sessions 120 are run against the currently executing operating system 108. The debugging sessions 120 may be run against the currently executing operating system 108 when the operating system 108 is not functioning as expected; for example, when the operating system 108 is crashed or hung.

In one embodiment, the debugging session apparatus 106 is configured to provide more than one simultaneous debugging session for the currently executing operating system 108 on the computer 110*a*. The term "currently executing operating system" is used to refer to an operating system 108 that is executing on the computer 110*a*, though it may be crashed or hung or experiencing other abnormalities. The term does not encompass a system dump (also known as a kernel dump). The debugging sessions 120*a-b* may be running on separate computers 110*b-c*. In certain embodiments, a debugging session 120 is also running on the computer 110*a* that includes the operating system 108.

Figure 2:
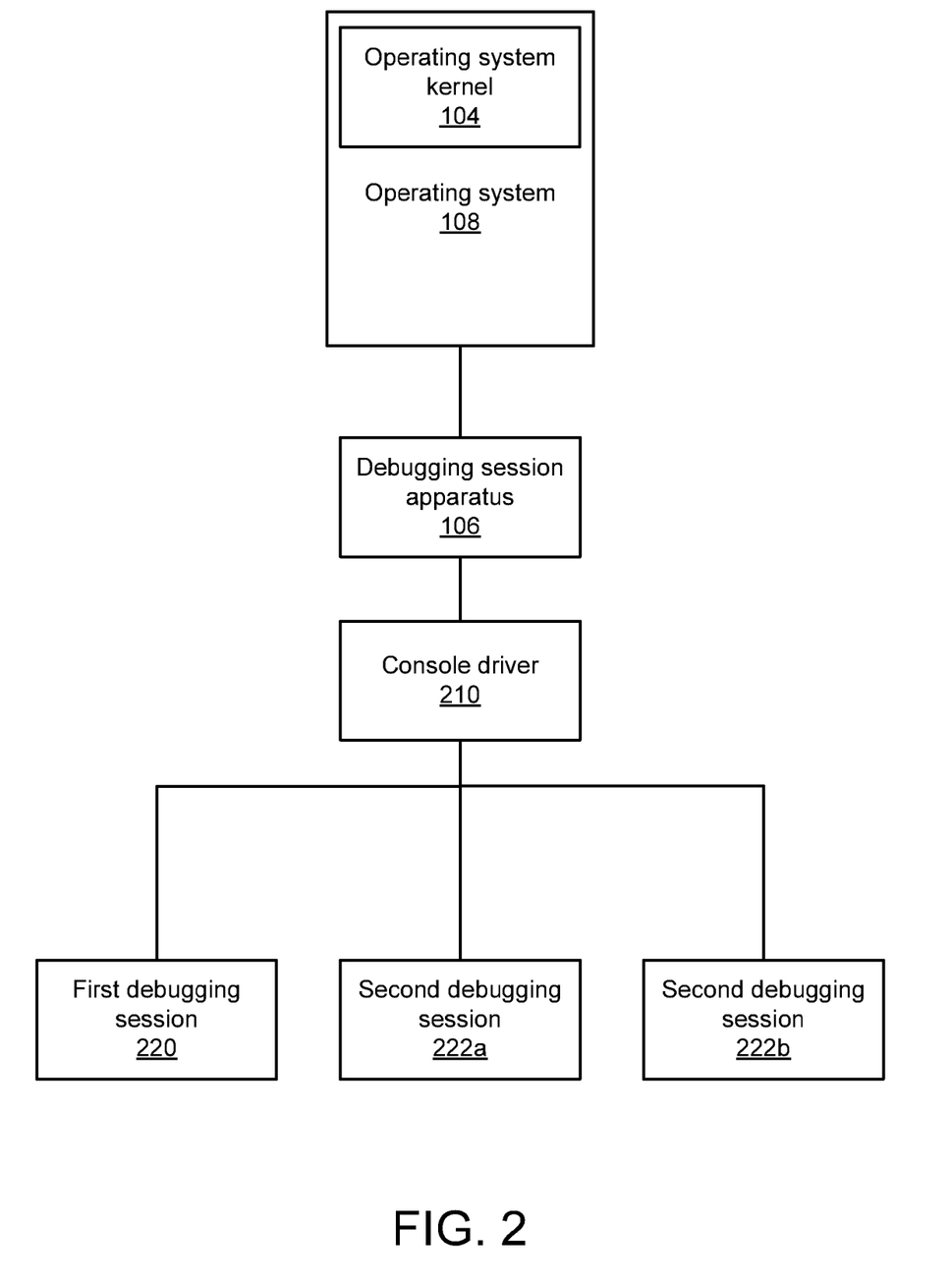
FIG. 2 is a schematic block diagram illustrating another view of a system for providing multiple, concurrent debugging sessions for debugging an operating system.

FIG. 2 shows a schematic block diagram representing one embodiment of a system for debugging a currently executing operating system 108. FIG. 2 shows an operating system 108 with an operating system kernel 104, a debugging session apparatus 106, a console driver 210, a first debugging session 220 and second debugging sessions 222*a-b*.

The debugging session apparatus 106 may provide one user (for example, the user of computer 110*b*) with a first debugging session 220 for debugging the currently executing operating system 108. The first debugging session 220 has read access to the data on the currently executing operating system 108, and also has write access to the data on the currently executing operating system 108.

The debugging session apparatus 106 may also provide other users with second debugging sessions 222*a-b* of the currently executing operating system 108. While FIG. 2 shows two second debugging sessions 222, any number of second debugging sessions 222 may be provided. Each of the second debugging sessions 222*a-b* may have read-only access to the data for the currently executing operating system 108. The second debugging sessions 222*a-b* may run simultaneously with the first debugging session 220 that has read access and write access to the currently executing operating system 108. That the first debugging session 220 and the second debugging sessions 222*a-b* may be simultaneous means that the sessions can occur at the same time. Simultaneous is not limited to that the first and second debugging sessions 220, 222*a-b* start at the same time, and end at the same time. Simultaneous is used to indicate that the sessions may overlap in time.

The terms "first" and "second" used in connection with the debugging sessions are used to convey that the debugging sessions are separate and that they have distinct privileges. The terms are not used to imply or suggest a temporal relationship between the debugging sessions.

Allowing one or more second debugging sessions 222*a-b* to run simultaneously with the first debugging session 220 may allow more users to debug a failure on a currently executing operating system 108, and to quickly resolve the issue. While the users of the second debugging sessions 222*a-b* may be limited in terms of write access, those users can still perform valuable functions in debugging the operating system 108 such as checking the stack trace, along with the values in other data structures for the operating system 108 that can be used to identify the root cause of the crash, hang, or other problem affecting the operating system 108.

In certain embodiments, a console driver 210 is used to support the first debugging session 220 and the second debugging sessions 222*a-b*. The console driver 210 facilitates the exchange of information between the first debugging session 220, the second debugging sessions 222*a-b*, and the debugging session apparatus 106. As explained above, the computers 110 that support the first debugging session 220 and the second debugging sessions 222*a-b* may be remote from the computer 110 that is executing the operating system 108. The console driver 210 may help facilitate communications over a network 130 or other connection.

Figure 3:
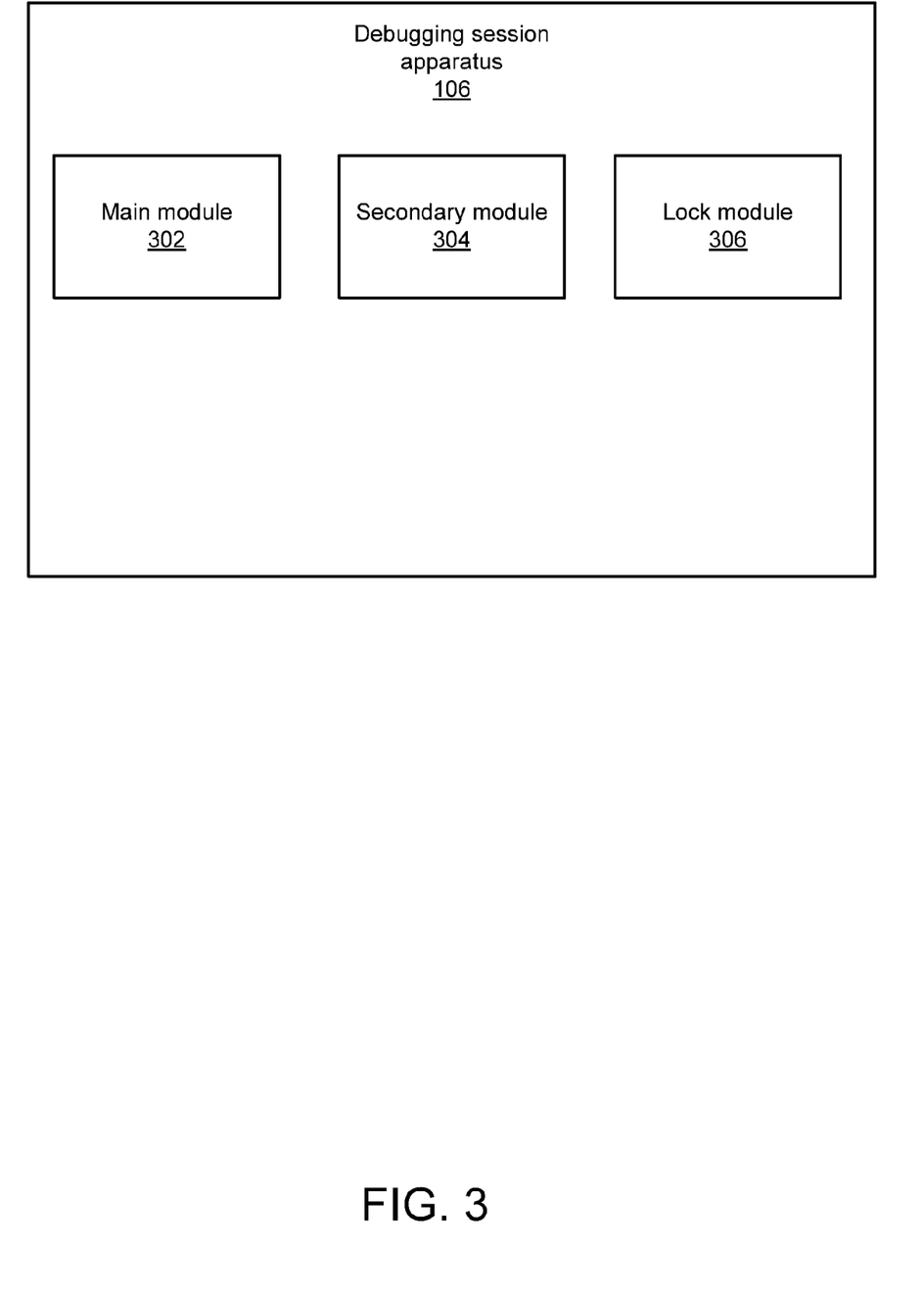
FIG. 3 is a schematic block diagram illustrating one embodiment of a debugging session apparatus.

FIG. 3 shows one embodiment of a debugging session apparatus 106. In certain embodiments, the modules shown in FIG. 3 are located in the debugging session apparatus 106. In other embodiments, the modules are distributed among the various components of the system 100. In the depicted embodiment, the debugging session apparatus 106 includes a main module 302, a secondary module 304, and a lock module 306.

In one embodiment, the main module 302 is configured to provide the first debugging session 220 for the currently executing operating system 108. The first debugging session 220 has read access to the currently executing operating system 108 data, and has write access to the currently executing operating system 108 data. Having write access to the currently executing operating system 108 data may allow the user of the first debugging session 220 to modify data structures of the operating system 108, setting break points for the operating system 108 as part of debugging the operating system 108, etc.

The debugging session apparatus 106 may also include a secondary module 304. The secondary module 304 may be configured to provide one or more second debugging sessions 222 of the currently executing operating system 108. Each of the second debugging sessions 222 may have read-only access to the currently executing operating system 108 data. These second debugging sessions 222 may run simultaneously with the first debugging session 220 when the second debugging sessions 222 are started while the first debugging session 220 is active. As a result, a plurality of users can debug the currently execution operating system 108 at the same time, increasing the likelihood that the problems affecting the executing operating system 108 can be resolved quickly.

In certain embodiments, the secondary module 304 notifies the user that the second debugging session 222 provided by the secondary module 304 is read only and that there are no write privileges associated with the second debugging session 222.

The debugging session apparatus 106 may also include a lock module 306. The lock module 306 may be configured to provide a lock to the first debugging session 220. The lock provides the first debugging session 220 with exclusive write access to the currently executing operating system 108 data. As used herein, exclusive write access refers to exclusive access as between the first debugging session 220 and the second debugging sessions 222. Other processes may have write access to the operating system 108, such as processes not associated with the debugging session apparatus 106. As used herein, a lock refers to a data structure or variable that allows one debugging session to have write access to the operating system 108 data. The first debugging session 220 has ownership of the lock, and thereby has write privileges for the operating system 108 data. The lock module 306 may be configured to provide only one lock, such that only one debugging session (the first debugging session 220) has write privileges for the operating system 108 data.

The lock module 306 may also be configured to receive a lock release command that disassociates the lock with the first debugging session 220. Upon receipt of a lock release command, the lock module 306 may disassociate the lock with the first debugging session 220. In certain embodiments, the lock module 306 asks the user of the first debugging session to confirm the lock release before disassociating the lock with the first debugging session 220. The released lock may be available to all debugging sessions. A user of one of the second debugging sessions 222 may request the released lock in order to gain write access to the operating system 108 data. The second debugging session 222 that receives the lock is then the first debugging session 220.

In certain embodiments, the lock module 306 may be configured to receive a transfer command that associates the lock with one of the second debugging sessions 222. A user may initiate the transfer command from one of the computers 110 supporting a second debugging session 222. In certain embodiments, the user may select an icon to initiate the transfer. In other embodiments, the user may enter a command line entry to initiate the transfer. The second debugging session 222 that receives the lock becomes the first debugging session 220 having write access to the operating system 108 data. If the lock is in use by a first debugging session 220 at the time the transfer command is received, the user of the first debugging session 220 may have to authorize the transfer before the lock is transferred to the second debugging session 222 and the first debugging session 220 loses write access to the operating system 108 data. If the user of the first debugging session 220 authorizes the transfer, the lock is transferred and the first debugging session 220 becomes one of the second debugging sessions 222 without write access, and the second debugging session 222 that receives the lock becomes the first debugging session 220 with write access.

Figure 4:
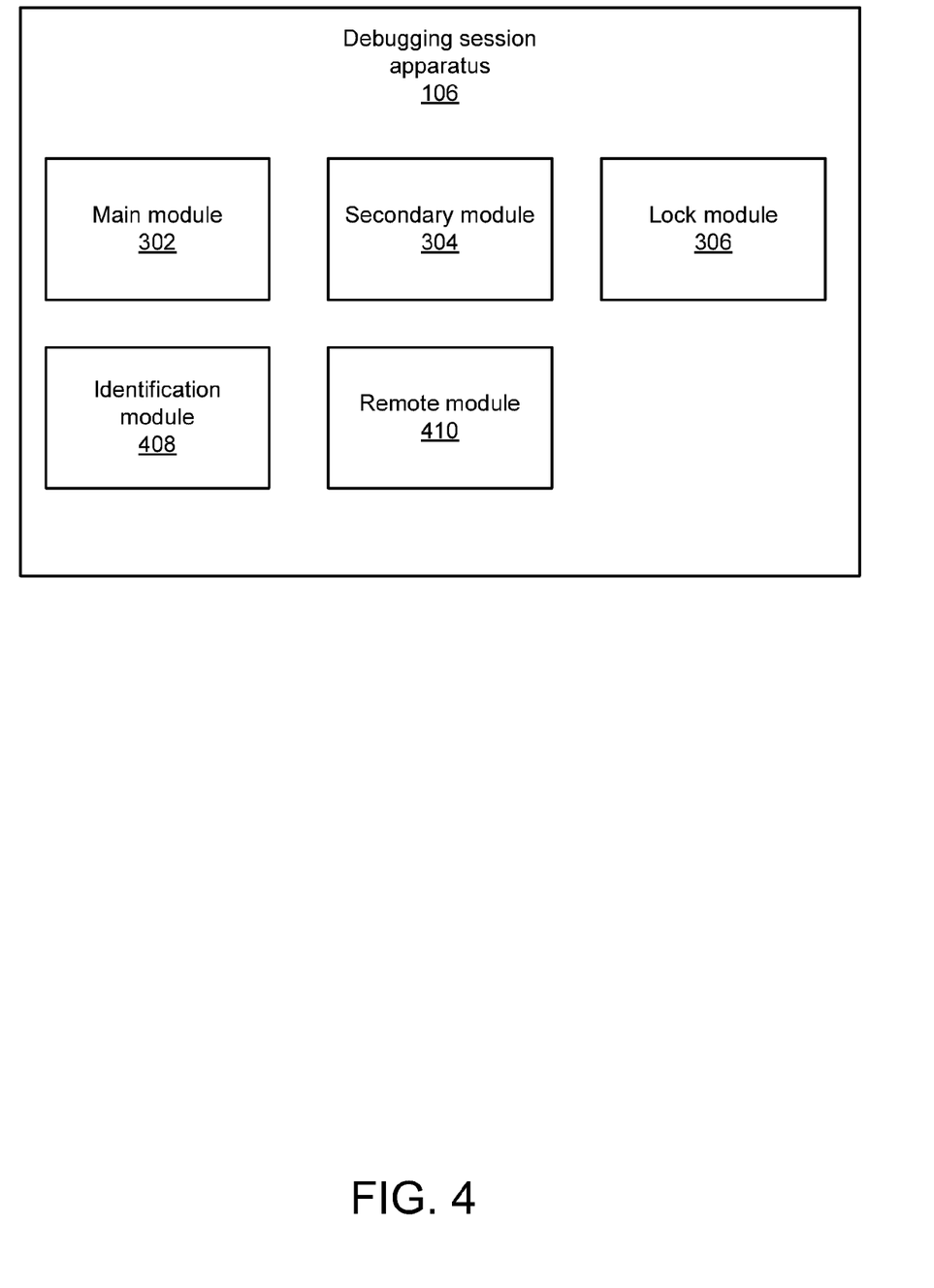
FIG. 4 is a second schematic block diagram illustrating one embodiment of a debugging session apparatus.

FIG. 4 shows on embodiment of a debugging session apparatus 106 comprising an identification module 408 and a remote module 410. The identification module 408 may be configured to associate each debugging session (whether a first debugging session 220 or a second debugging session 222) with a unique identifier. The unique identifier may be, for example, an alpha-numeric tag. In certain embodiments, the unique identifier is associated with each read command sent by a debugging session. In such embodiments, each read command will have a unique identifier sent with the read command. Each write command sent by the first debugging session 220 will also have the unique identifier in such an embodiment. The unique identifiers may be used to ensure that the results of each command are sent back to the correct debugging session, and to ensure that only the first debugging session 220 has write access to the operating system 108 data.

The debugging session apparatus 106 may further comprise a remote module 410. The remote module 410 may be configured to allow a first user (i.e., the user associated with the first debugging session 220) to remotely access the operating system 108 through a first debugging session 220 on a remote computer 110, and one or more second users to remotely access the operating system 108 through one or more second debugging sessions 222 on remote computers 110. The remote module 410 may support communications between the remote computers 110 and the kernel debugger 112. The remote module 410 may support a communications over one or more protocols such as (but not limited to) Ethernet, USB, firewire, and others.

Figure 5:
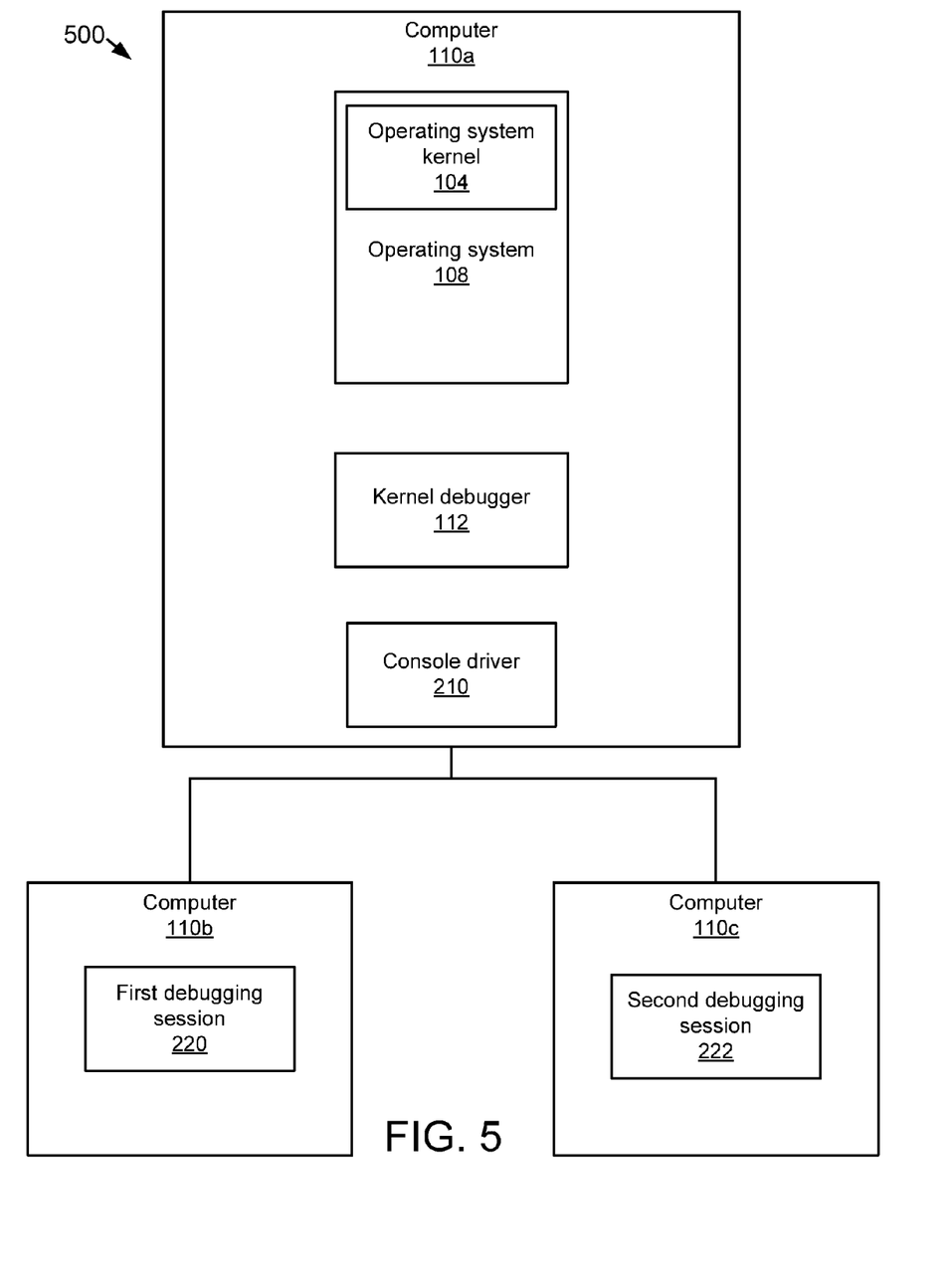
FIG. 5 is a schematic block diagram illustrating another view of a system for providing multiple, concurrent debugging sessions for debugging an operating system.

FIG. 5 shows one embodiment of a system 500 for debugging a currently executing operating system 108. The system 500 includes a computers 110*a-c* that are communicatively connected. Computer 110*a* is shown to include an operating system 108 having an operating system kernel 104, a kernel debugger 112, and a console driver 210. The computer 110*b* supports a first debugging session 220, and the computer 110*c* supports a second debugging session 222.

The debugging session apparatus 106 may be distributed among the components shown in FIG. 5. For example, the debugging session apparatus 106 may be distributed between the kernel debugger 112 and the console driver 210. In one embodiment, the console driver 210 is modified to support a plurality of debugging sessions. The kernel debugger 112 may also be modified to support a plurality of debugging sessions. These components may be modified to support one first debugging session 220 that has both read access and write access to the data of the currently executing operating system 108, and one or more second debugging sessions 222 that have only read access to the data of the currently executing operating system 108.

The kernel debugger 112 may be configured to maintain a lock that ensures that only the first debugging session 220 has write access to the operating system 108 data. As described above, the system 500 may be configured to allow users of the various debugging sessions to release and claim the lock.

In certain embodiments, the kernel debugger 112 is invoked in response to the operating system 108 crashing. The kernel debugger 112 may be configured to automatically initiate the first debugging session 220 in response to the operating system 108 crashing. A debugging session may need to be manually initiated in response to the operating system 108 hanging. In certain embodiments, the user who is first to manually initiate a debugging session is given the first debugging session 220 that has write access. In both cases, subsequent debugging sessions may be given read-only access as second debugging sessions 222.

The console driver 210 and kernel debugger 112 may work jointly to execute the commands received in connection with the first debugging session 220 and the second debugging session 222. In certain embodiments, the console driver 210 is configured to associate each command issued by a debugging session with a unique identifier for the debugging session. The kernel debugger 112 may be similarly configured. Such an arrangement may allow the responses to the commands to be routed to the debugging session that originated the command. This arrangement may also be useful to ensure that only the first debugging session 220 issues write commands against the data of the currently executing operating system 108.

For example, a user of the first debugging session 220 may be debugging a process one in the currently executing operating system 108. The user of the second debugging session 222 may be debugging a process two in the currently executing operating system 108. By associating unique identifiers with the commands issued by the first debugging session 220 and the second debugging session 222, the first debugging session 220 will receive the responses to commands it issued in connection with process one, while the second debugging session 222 will receive the responses to commands it issued in connection with process two.

Figure 6:
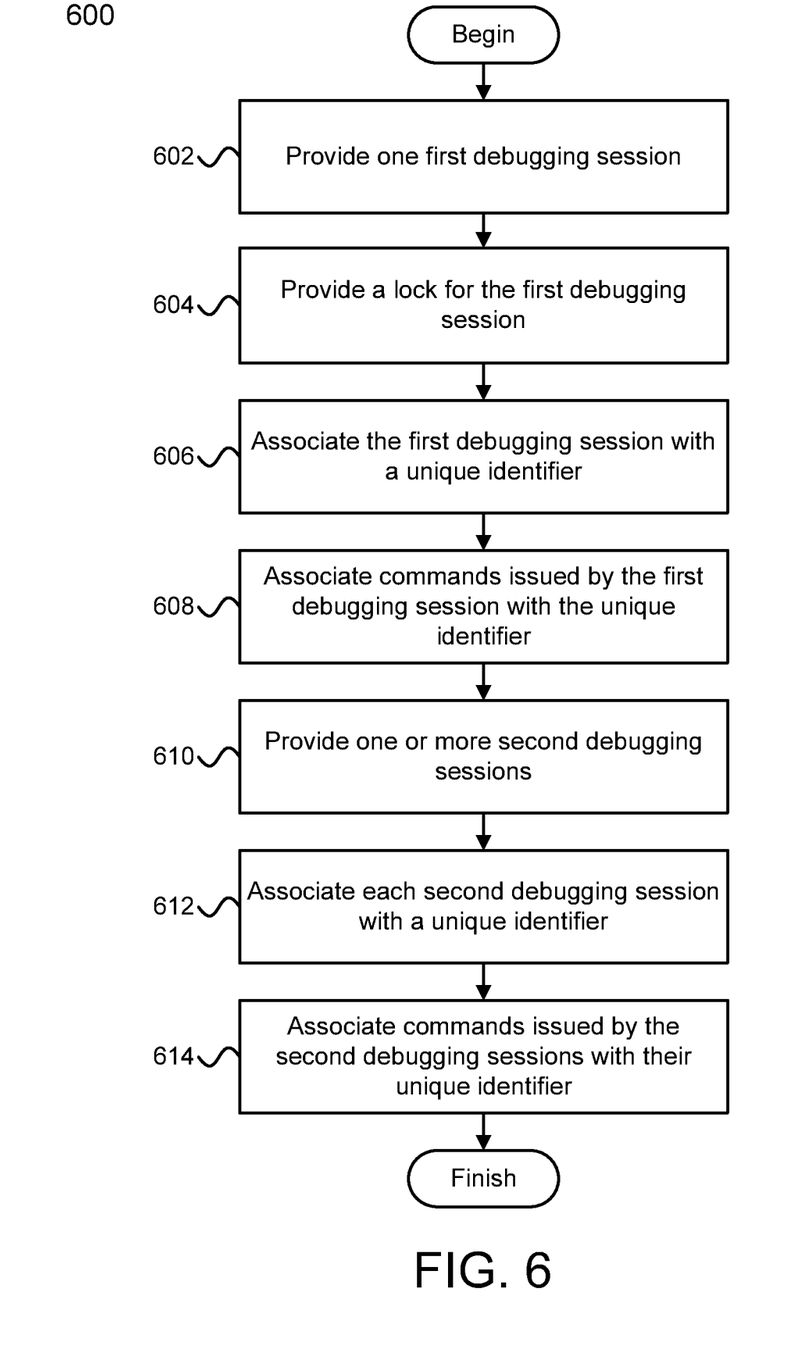
FIG. 6 is a schematic flow chart diagram illustrating one embodiment of a method for providing multiple, concurrent debugging sessions for debugging an operating system.

FIG. 6 shows one embodiment of a method 600 for debugging a currently executing operating system 108. The method 600 begins with providing 602 one first debugging session 220. The first debugging session 220 may be for debugging a currently executing operating system 108. The first debugging session 220 may provide the user with read access to the currently executing operating system 108 data, as well as write access to that data.

The method 600 may further involve providing 604 a lock for the first debugging session 220. The lock may provide the first debugging session 220 with exclusive write access to the currently executing operating system 108 data.

The method 600 may further involve associating 606 the first debugging session 220 with a unique identifier that allows the first debugging session 220 to be distinguished from other debugging sessions. The method 600 may also involve associating 608 commands issued by the first debugging session 220 with the unique identifier. This may allow the debugging session apparatus 106 to ensure that the results of the commands are provided to the correct debugging session. The unique identifiers may also ensure that the kernel debugger 112 can ensure that the proper context is used in responding to the commands.

The method 600 may also involve providing 610 one or more second debugging sessions 222 for the currently executing operating system 108. Each of the second debugging sessions 222 may have read-only access to the data of the currently executing operating system 108. The second debugging sessions 222 may run simultaneously with the first debugging session 220 if the second debugging sessions are started while the first debugging session 220 is active. Similarly, the second debugging sessions 222 may run simultaneously with each other, such that three or more debugging sessions are being run concurrently.

The method 600 may further provide for associating 612 each second debugging session 222 with a unique identifier, and associating the commands issued by the second debugging sessions with their unique identifier.

Figure 7:
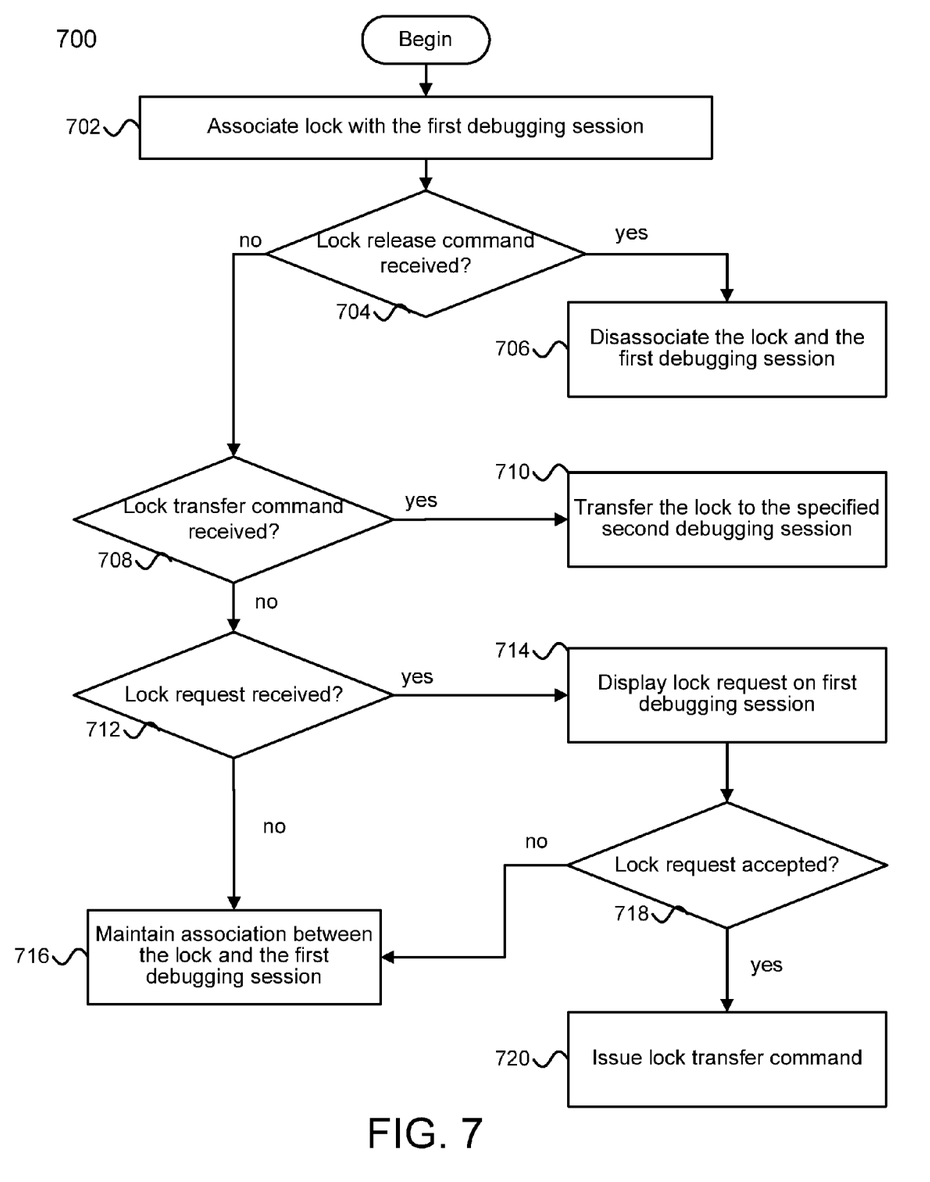
FIG. 7 is a schematic flow chart diagram illustrating one embodiment of a method for managing a lock used by multiple, concurrent debugging sessions.

FIG. 7 shows one embodiment of a method 700 for managing locks for debugging sessions. The method 700 begins with associating 702 a lock with the first debugging session 220. In certain embodiments, a user may request the association. In other embodiments, a computer may automatically associate the lock with the first debugging session 220. The method 700 continues with determining 704 whether a lock release command has been received. The lock release command disassociates the lock with the first debugging session 220. If a lock release command is received, the method 700 may involve disassociating 706 the lock and the first debugging session 220 in response.

The method 700 may also involve determining 708 whether a lock transfer command has been received. The lock transfer command associates the lock with a specified second debugging session 222. The lock transfer command may specify the second debugging session 222 to receive the lock. The method 700 involves transferring 710 the lock to the specified second debugging session 222 in response to the lock transfer command being received. The second debugging session 222 that receives the lock as a result of the lock transfer gains write privileges and thus becomes the new first debugging session 220. The debugging session that loses the lock as a result of the lock transfer command loses write privileges and thus becomes a second debugging session 222.

The method 700 may also involve determining 712 whether a lock request is received. A lock request requests transfer of the lock from the first debugging session 220 to a second debugging session 222. The method 700 may involve displaying 714 the lock request on the first debugging session 220 if the lock request is received. A determination 718 may then be made as to whether the lock request is accepted by the user of the first debugging session 220. If the lock request is accepted, a lock transfer command is issued 720. If the lock request is not accepted, the association between the lock and the first debugging session 220 is maintained 716.

Figure 8:
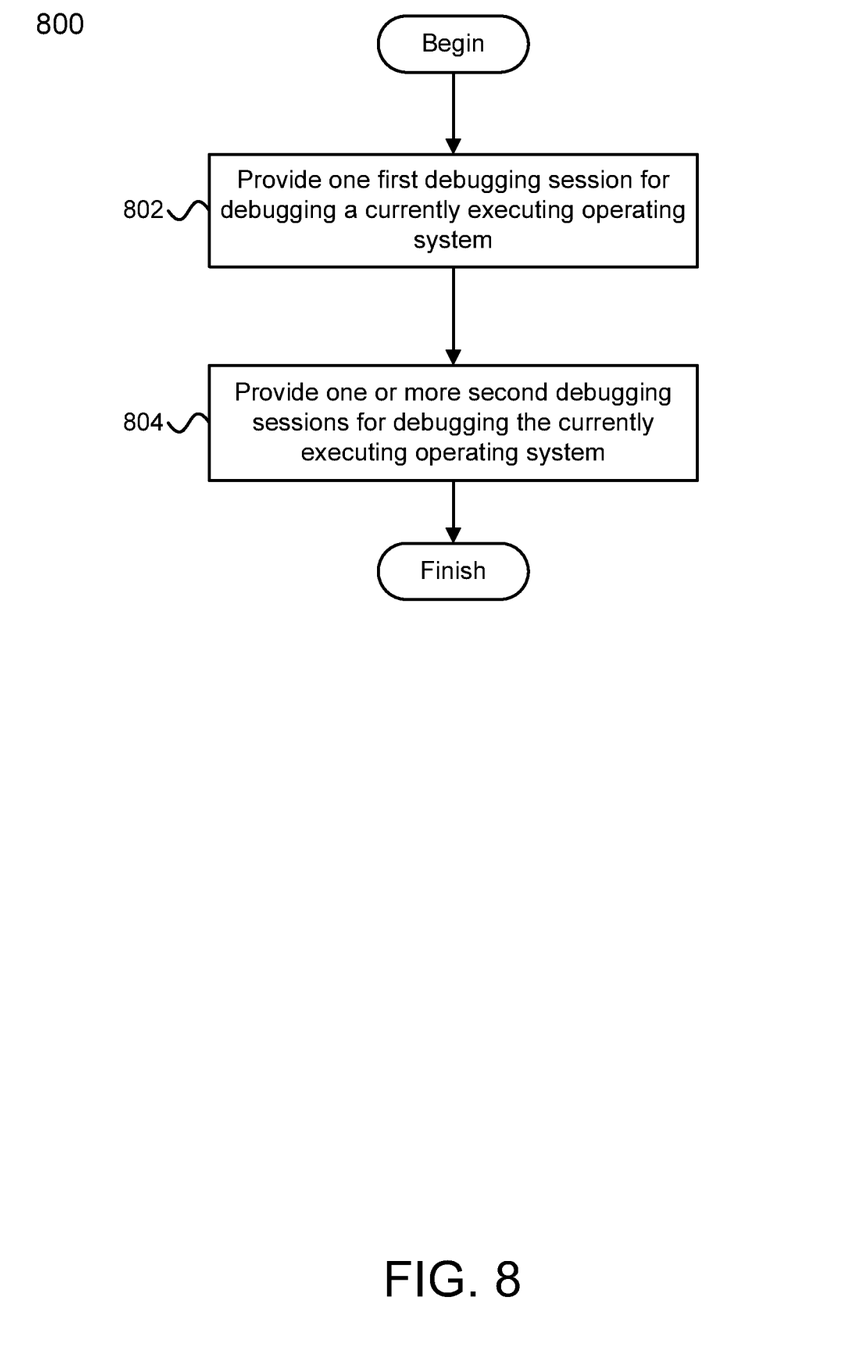
FIG. 8 is a schematic flow chart diagram illustrating one embodiment of a method for providing debugging sessions for debugging an operating system.

FIG. 8 shows one embodiment of a method 800 for debugging a currently executing operating system 108. The method 800 includes providing 802 one first debugging session 220 for debugging the currently executing operating system 108. The first debugging session 220 may have read access to the currently executing operating system 108 data, and write access to the currently executing operating system 108 data.

The method may also involve providing 804 one or more second debugging sessions 222 for debugging the currently executing operating system 108. Each of the second debugging sessions 222 may have read-only access to the currently executing operating system 108 data. As explained above, the second debugging sessions 222 may run simultaneously with the first debugging session 220 if the second debugging session 222 is started while the first debugging session 220 is active.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for debugging a currently executing operating system, the method comprising:
   providing one first debugging session for debugging a currently executing operating system, the first debugging session having read access to currently executing operating system data and write access to the currently executing operating system data; and
   providing one or more second debugging sessions for debugging the currently executing operating system, each of the second debugging sessions having read-only access to the currently executing operating system data, and the second debugging sessions running simultaneously with the first debugging session in response to the second debugging sessions starting while the first debugging session is active.

2. The method of claim 1, further comprising associating a lock to the first debugging session, the lock providing the first debugging session with exclusive write access among debugging sessions to the currently executing operating system data.

3. The method of claim 2, further comprising receiving a lock release command that disassociates the lock with the first debugging session.

4. The method of claim 2, further comprising receiving a lock transfer command that associates the lock with the second debugging session, wherein the second debugging session that receives the lock becomes the first debugging session.

5. The method of claim 2, further comprising:
receiving a lock request from the second debugging session, the lock request requesting transfer of the lock from the first debugging session to the second debugging session; and
displaying the lock request in the first debugging session in response to receiving the lock request.

6. The method of claim 5, further comprising transferring the lock from the first debugging session to the second debugging session in response to a user of the first debugging session accepting the lock request.

7. The method of claim 1, further comprising associating each debugging session with a unique identifier.

8. The method of claim 7, further comprising associating each command issued by the debugging session with the unique identifier of the debugging session.

9. The method of claim 1, the first debugging session further supporting one or more break points.

10. The method of claim 1, further comprising allowing a first user to remotely access the currently executing operating system through the first debugging session.

11. The method of claim 10, further comprising allowing one or more second users to remotely access the currently executing operating system through the second debugging sessions.

12. A system comprising:
a processor and memory;
an operating system kernel;
a debugging session apparatus comprising:
a main module configured to provide one first debugging session for debugging a currently executing operating system, the first debugging session having read access to currently executing operating system data and write access to the currently executing operating system data; and
a secondary module configured to provide one or more second debugging sessions for debugging the currently executing operating system, each of the second debugging sessions having read-only access to the currently executing operating system data, and the second debugging sessions running simultaneously with the first debugging session in response to the second debugging sessions starting while the first debugging session is active.

13. The system of claim 12, further comprising a console driver that supports a plurality of debugging sessions.

14. The system of claim 12, further comprising a remote module configured to allow a first user to remotely access the currently executing operating system through the first debugging session, and one or more second users to remotely access the currently executing operating system through the second debugging sessions.

15. The system of claim 12, further comprising a lock module configured to associate a lock with the first debugging session, the lock providing the first debugging session with exclusive write access among debugging sessions to the currently executing operating system data.

16. An apparatus comprising:
a main module configured to provide one first debugging session for debugging a currently executing operating system, the first debugging session having read access to currently executing operating system data and write access to the currently executing operating system data; and
a secondary module configured to provide one or more second debugging sessions for debugging the currently executing operating system, each of the second debugging sessions having read-only access to the currently executing operating system data, and the second debugging sessions running simultaneously with the first debugging session in response to the second debugging sessions starting while the first debugging session is active,
wherein the main module and the secondary module comprise one or more of hardware and computer readable program code, the computer readable program code stored on one or more non-transitory computer readable storage media.

17. The apparatus of claim 16, further comprising a lock module configured to associate a lock with the first debugging session, the lock providing the first debugging session with exclusive write access among debugging sessions to the currently executing operating system data.

18. The apparatus of claim 17, the lock module further configured to receive a lock release command that disassociates the lock with the first debugging session.

19. The apparatus of claim 18, the lock module further configured to receive a lock transfer command that associates the lock with the second debugging session, wherein the second debugging session that receives the lock becomes the first debugging session.

20. The apparatus of claim 16, further comprising an identification module configured to associate each debugging session with a unique identifier.

* * * * *